(12) United States Patent
Lydic et al.

(10) Patent No.: US 8,056,886 B2
(45) Date of Patent: Nov. 15, 2011

(54) ASPIRATOR

(75) Inventors: Trent Lydic, Lyndhurst, OH (US); Nilesh Dingankar, Denton, TX (US)

(73) Assignee: Jet Inc., Cleveland, OH (US)

( * ) Notice: Subject to any disclaimer, the term of this patent is extended or adjusted under 35 U.S.C. 154(b) by 988 days.

(21) Appl. No.: 11/968,320

(22) Filed: Jan. 2, 2008

(65) Prior Publication Data
US 2008/0173727 A1 Jul. 24, 2008

Related U.S. Application Data

(60) Provisional application No. 60/878,271, filed on Jan. 2, 2007.

(51) Int. Cl.
*C02F 1/74* (2006.01)
*B01F 3/04* (2006.01)

(52) U.S. Cl. .......................... 261/87; 210/628

(58) Field of Classification Search .............. 261/83–85, 261/87, 93; 366/101, 102; 239/8; 210/628, 210/150
See application file for complete search history.

(56) References Cited

U.S. PATENT DOCUMENTS

| | | | |
|---|---|---|---|
| 1,124,855 A | 1/1915 | Callow et al. | |
| 1,380,970 A | 6/1921 | Meredith-Jones | |
| 2,288,063 A * | 6/1942 | Ashlock, Jr. ................... | 261/87 |
| 3,400,918 A | 9/1968 | MacLaren | |
| 3,776,531 A | 12/1973 | Ebner et al. | |
| 3,779,531 A | 12/1973 | White | |
| 4,505,813 A | 3/1985 | Graves | |
| 4,844,843 A | 7/1989 | Rajendren | |
| 4,925,598 A * | 5/1990 | Kivisto et al. ................... | 261/87 |
| 5,013,490 A * | 5/1991 | Tanimoto et al. ............... | 261/87 |
| 5,160,667 A | 11/1992 | Gross | |
| 5,318,360 A | 6/1994 | Langer et al. | |
| 5,599,452 A | 2/1997 | MacLaren | |
| 6,318,705 B1 | 11/2001 | MacLaren | |
| 2009/0243124 A1 * | 10/2009 | Elliott et al. ..................... | 261/87 |

FOREIGN PATENT DOCUMENTS

| | | |
|---|---|---|
| JP | 63-028432 | 2/1998 |
| SU | 1315391 A1 | 6/1987 |

OTHER PUBLICATIONS

International Preliminary Report on Patentability, Intl. Application PCT/US2009/030050. International Bureau of WIPO, Jul. 15, 2010.
International Search Report, Intl. Application PCT/US2009/030050. ISA/KR, May 28, 2009.

* cited by examiner

*Primary Examiner* — Frank Lawrence, Jr.
(74) *Attorney, Agent, or Firm* — The Marbury Law Group, PLLC

(57) ABSTRACT

An aspirator includes a plurality aspirator tubes, each preferably extending at approximately 70 degrees from a central axis and including a fin extending a limited distance below the aspirator tube outlet. The design improves mixing and gas contact, yet has reduced power requirements, by using a plurality of debris-shedding, finned aspirator tubes to inject approximately 35% more air than the best prior art designs at the same rotational speed. Further, the aspirator of the present invention improves motor life by reducing the average current draw on the motor. The aspirator is useful in many applications, including sewage and wastewater treatment, oxygenation, fermentation, aeration, hydrogenation, oxidation, and oil-sand separation.

19 Claims, 3 Drawing Sheets

ASPIRATOR

This application claims the benefit of U.S. Provisional Application Ser. No. 60/878,271, filed Jan. 2, 2007, which is hereby incorporated by reference for all purposes.

BACKGROUND OF THE INVENTION

The present invention relates generally to an aspirator. In particular, the present invention is directed toward an aspirator that improves mixing and gas contact, yet has reduced power requirements, by using a plurality of material-shedding, finned aspirator tubes to inject approximately 35% more air than the prior art design of U.S. Pat. No. 6,318,705 at the same rotational speed. Further, the aspirator of the present invention improves motor life by reducing the average current draw on the motor. The aspirator is useful in many applications, including sewage and wastewater treatment, oxygenation of fish ponds and aquaculture tanks, and any other gas-liquid mixing process such as, fermentation, aeration, hydrogenation, and oxidation. The aspirator is also useful in for providing vortex generation and air lift in a chamber used to separate oil from the sand and water solution in the production of synthetic crude oil from oil sands.

Prior art aspirators of this type are typically found in the field of wastewater treatment. Commonly assigned U.S. Pat. No. 5,599,452 to MacLaren et al. discloses a wastewater treatment method which uses such a conventional aspirator design.

Commonly assigned U.S. Pat. No. 6,318,705 to MacLaren discloses an aspirator design that is utilized to introduce air, oxygen, or other gases into a liquid. This design improved on the aspirator design of U.S. Pat. No. 5,599,452 with the ability to inject approximately 30% more air at 50% of the rotational speed. The aspirator included a 45 degree angle between the shaft and tubes to help shed debris that might otherwise collect on the aspirator and further included fins running along the entire length of the underside of the aspirator tubes to provide a larger profile for increased mixing. The present inventors consider this as the best prior art design for comparison purposes with the present invention, as detailed below.

U.S. Pat. No. 3,400,918 to MacLaren discloses a predecessor sewage aerator from the same inventor.

U.S. Pat. No. 4,844,843 to Rajendren and U.S. Pat. No. 5,160,667 to Gross disclose prior art liquid treatment aerators.

U.S. Pat. No. 3,776,531 to Ebner, et al. discloses an apparatus with separate propeller blades and aspirator tubes for dispersing and entraining a fluid, particularly a gas, in a liquid. This patent teaches that the aspirator tubes should be at an angle between 35 degrees and 75 degrees, when compared to the vertical axis of the shaft.

U.S. Pat. No. 5,318,360 to Langer, et al. discloses a gas dispersion stirrer comprising a rotatable shaft and at least one hollow, disk-shaped stirring/aspirating member. This patent teaches the inclusion of flow-inducing blades on both the top side and the bottom side of the disk-shaped member.

The Soviet Union patent SU 1,315,391 shows the utilization of swirlers 13 on the outer edges of the hollow vanes 5.

U.S. Pat. No. 3,779,531 to White shows some aeration tubes that are utilized at a downward angle compared to the vertical shaft.

The Japanese patent JP 63-028432 shows inclined aeration tubes in FIGS. 1 and 3.

U.S. Pat. No. 1,380,970 to Meridith-Jones shows the utilization of rods to break up liquid.

U.S. Pat. No. 1,124,855 to Callow, et al. shows angled aeration tubes 13 in FIG. 1.

BRIEF SUMMARY OF THE INVENTION

The aspirator design of the present invention includes a fin at the lower end of each of a plurality of aspirator tubes, which are preferably formed at an approximately 70 degree angle relative to the aspirator shaft. The aspirator is utilized to introduce air or other gases into a liquid. The inner edge of the fins provides an additional surface for the creation of cavitation in the liquid, thus improving gas/liquid contact and mixing within the liquid. The advantages of the present design include the ability to inject approximately 35% more air than the design of U.S. Pat. No. 6,318,705 with a lower average current draw at the same rotational speed, thus either reducing the power requirements for the aspirator, improving the gas/liquid contact and mixing within the liquid, or both. The lower average current draw under normal operating conditions also increases the lifespan of the motor by approximately 11.75%.

The shorter fins at the lower ends of the aspirator tubes helps to shed debris that might otherwise collect on the aspirator, yet reduces undesirable drag. Superior mixing is provided by the cavitation created by the fins of the aspirator because the fins along the bottom of the aspirator tubes help to create larger voids in the liquid. This increases the aspirator's capacity to inject air or other gases, while minimizing the material requirements of the part. The increased aspiration of air or other gas bubbles into the liquid can also improve the lifting of liquid adjacent the aspirator to improve circulation in a tank or other enclosure. It can also be desirable to orient the aspirator tubes at an angle that will tend to maximize the mixing in a tank due to gas or air lift. In an embodiment of a wastewater treatment tank, an angle of approximately 70 degrees between the aspirator shaft and the aspirator tubes was found to be a preferred angle.

DETAILED DESCRIPTION OF THE INVENTION

Figure 1:
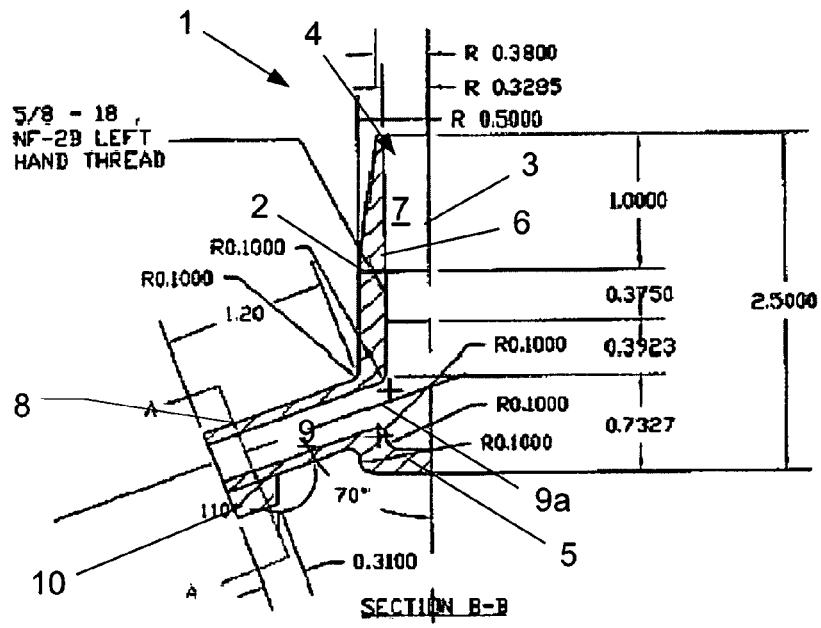
FIG. 1 illustrates a cross sectional view of one embodiment of the aspirator of the present invention.
Figure 2:
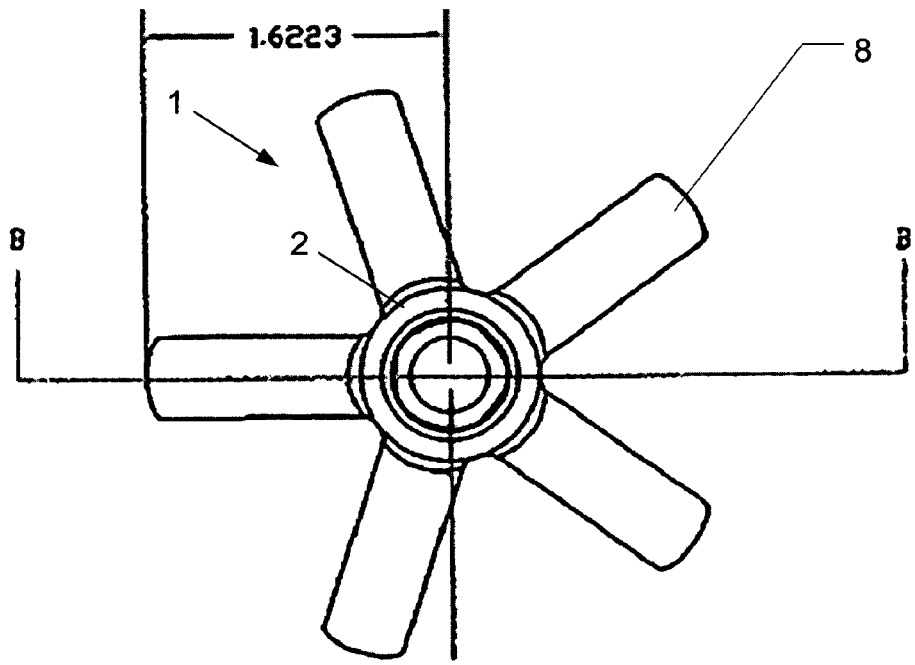
FIG. 2 illustrates a top view of an embodiment of the aspirator of the present invention.

FIG. 1 illustrates a cross sectional view of the aspirator 1 taken along section B-B of FIG. 2. The aspirator 1 includes a generally cylindrical main body 2 having a central axis 3, an open first end 4, and closed second end 5, and an inner wall 6 defining a hollow interior 7. A plurality of straight, equally-spaced aspirator tubes 8 extend radially from the second end 5 of the main body 2 at an angle $\alpha$ of approximately 70° from the central axis 3 in a direction opposite from the first end 4. In the preferred embodiment, five aspirator tubes 8 are employed. However, depending on aspirator tube size and application, other numbers of aspirator tubes may be employed without departing from the scope of the invention.

The aspirator tubes 8 include open-ended conduits 9 in communication at one end 9a with the hollow interior 7. Each aspirator tube 8 further includes a planar fin portion 10 extending from a side opposite the first end 4 of the main body 2. The fins 10 extend in a direction parallel to the central axis 3 and each fin 10 has a length and width less than the diameter of aspirator tubes 8.

A portion of the inner wall 7 can include internal threading (not shown) for engaging mating threads of a hollow aerator shaft. Use of left-hand threading is preferred so that the rotation of the shaft by typical motors will serve to tighten the connection.

Figure 3:
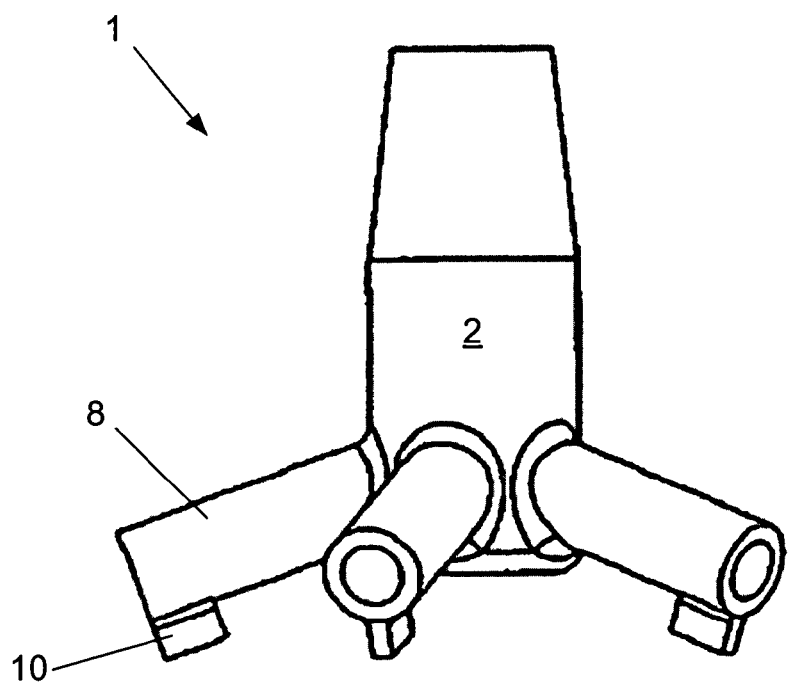
FIG. 3 illustrates an orthogonal view of an embodiment of the aspirator tubes of the present invention.

FIG. 2 illustrates a top view of one embodiment of the aspirator 1 and shows the equal length and equal spacing of aspirator tubes 8 of a preferred embodiment, as discussed above. FIG. 3 shows an orthogonal view of an aspirator 1 and the relationship between the aspirator tubes 8 and with the fins 10.

While illustrated as rectangular or substantially rectangular, the fins 10 can take other forms without departing from the scope of the present invention. The fins 10 are located adjacent the outlet end of each aspirator tube 8 on a bottom portion of the tube. Each fin only extends for a portion of the length of the aspirator tube 8. In this manner, the fins 10 have a large free edge that can create cavitation in a liquid when rotated, and the fins' cavitation-creating edges are located in a region with a high rotational velocity.

When compared to the fin of U.S. Pat. No. 6,318,705, the fins 10 of a preferred embodiment of the present invention are partial fins that are more efficient and cause less drag. As such, the preferred fins keep the induced cavitation going longer, which increases the surface area for dissolved gasses and increases gas/liquid exposure times. In the illustrated embodiment of FIG. 4, the inventor has found the partial fins and the larger angle of the tubes to have an improved self-cleaning function for the aspirator and that the fins create more desirable forms of cavitation that improve the turbidity of a treated liquid. The improved self-cleaning and turbidity are clearly important in wastewater treatment.

When an aerator shaft rotates the aspirator 1 in a liquid, the low pressure formed behind the fins 10 causes cavitation wherein voids, pockets of vapor formed due to the low pressure, are formed. These cavitation voids collapse, causing agitation which breaks up any agglomerated material in the liquid and mechanically reduces particle size. As stated in U.S. Pat. No. 5,599,452, which is incorporated herein by reference, this reduction in particle size is useful for enhancing wastewater treatment. This agitation can also be useful for oil-sand separation.

The locally formed low pressure region adjacent the rotating aspirator 1 additionally draws fluid from the hollow interior 7 through the aspirator tubes 8 and into the liquid. When used for wastewater treatment, the fluid can be air or oxygen. This is also useful for enhancing wastewater treatment, as disclosed in U.S. Pat. No. 5,599,452. Entrained bubbles also cause lifting of the liquid, which improves the circulation of the liquid.

When compared to the prior art aspirator of U.S. Pat. No. 6,318,705 at the same rotational speed, a preferred embodiment of the present invention draws in approximately 35% more air. The present invention further reduces the average current draw in a motor with a stator having 6.25 ohms resistance sufficiently to reduce the temperature of the motor by 2.35 C. Since each 10 C rise in motor temperature reduces motor life by 50%, it is estimated that the lower current draw and accompanying decrease in temperature of the motor resulting from use of the preferred embodiment of present invention prevents an 11.75% reduction in lifespan of the driving motor as compared to the prior art of U.S. Pat. No. 6,318,705.

Figure 4:
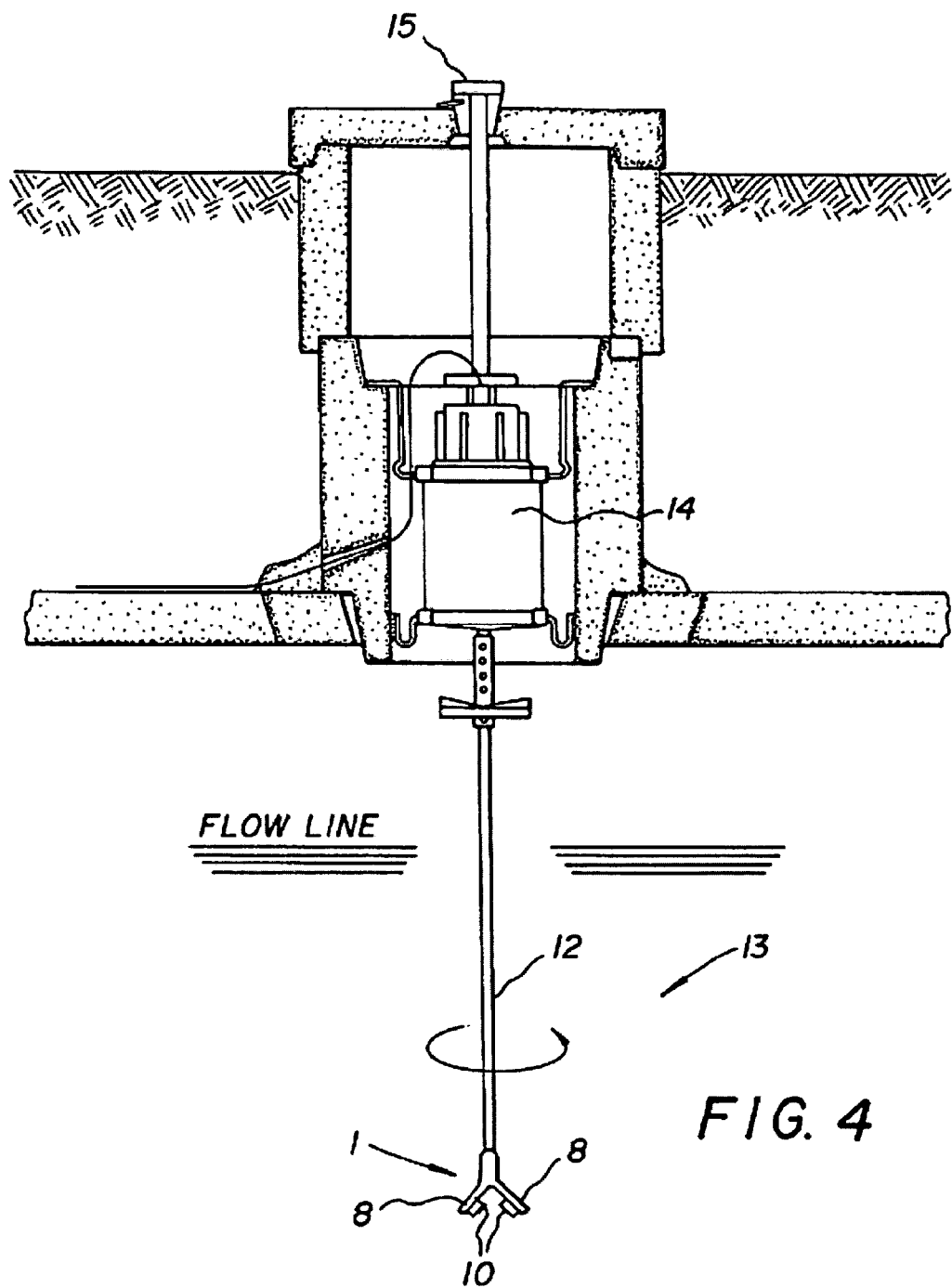
FIG. 4 illustrates a typical embodiment for practicing the method of the present invention.

FIG. 4 illustrates an arrangement for using the aspirator 1 for wastewater treatment. The aspirator 1 is rigidly mounted on a hollow aerator shaft 12 and inserted into the wastewater 13. Motor 14 rotates the shaft 12 and the low pressure formed adjacent the rotating aspirator 1 causes air to be drawn in from aperture 15, through hollow aerator shaft 12, into the hollow interior 7 of aspirator 1, and through aspirator tubes 8 into the wastewater 13. In this vertical position, the 70° angle of the aspirator tubes 8 relative to the central axis 3 helps shed debris that might otherwise collect on the aspirator 1.

In a preferred embodiment of the invention, the aspirator 1 is formed of Nylon 6-6 with 13% fiberglass fill, red. The balance of the aspirator 1 is held to a maximum of 0.01 inch-ounce. The tips of the aspirator tubes 8 are equally and accurately spaced so as to track in the same plane within 0.010 T.I.R. to the central axis 3. In one contemplated embodiment, the tips of tubes 8 extend 1.6223 inches perpendicular from the aspirator centerline axis 7 and each fin is 0.21×0.31 inches.

In one embodiment, the present invention is drawn to an aspirator comprising: a main body having a central axis, an open first end, a closed second end, and a inner wall defining a hollow interior; and a plurality of equally-spaced aspirator tubes radially extending from said second end of said main body, wherein said aspirator tubes include open-ended conduits in communication at one end with said hollow interior, and wherein each aspirator tube further includes a planar fin portion extending from a side opposite said first end of said main body and extending in a direction parallel to said central axis for a limited distance at an end of the aspirator tube opposite said main body.

Variations on this embodiment include those wherein: said plurality of equally-spaced aspirator tubes extend from said second end of said main body at an approximately 70° angle from said central axis in a direction opposite from said first end; said plurality of aspirator tubes comprises five aspirator tubes; and said main body is substantially cylindrical. Other variations include those where the main body further comprises internal threads on said inner wall for engaging a hollow shaft having external threads and those wherein said internal threads are left-handed.

In another embodiment, the aspirator above can be used in a method of aspirating a liquid, comprising: inserting a portion of a hollow shaft with the aspirator of claim 1 mounted thereon into a volume of liquid; and rotating said hollow shaft at a speed sufficient to cause the fins on the aspirator to produce cavitation voids. Variations of the method include those wherein said aspirating is used for a process selected from the group consisting of wastewater treatment, oxygenation, fermentation, aeration, hydrogenation, oxidation, and oil-sand separation; those wherein the planar fin portions of the aspirator tubes are sized and shaped to extend induced cavitation; and those further comprising rotating said hollow shaft with an electric motor, wherein the planar fin portions of the aspirator tubes are sized and shaped to reduce current draw by said electric motor.

In certain applications, the aspirator of the present invention may prove to be too efficient when used with existing motors, possibly causing tearing of biological mat formed on the BAT media or oversaturation of dissolved gasses. In these cases, a more appropriate motor, such as one operating at even lower power and rotational speed, can be used with the aspirator. In such a system, the further reduced current and operating temperatures will enhance the lifespan of the motor as well as lower electrical power requirements of the system.

Preferred and alternate embodiments of the present invention have now been described in detail. It is to be noted, however, that these embodiments are merely illustrative of the principles underlying the inventive concept of the present invention. It is therefore contemplated that various modifications of the disclosed embodiments will be apparent to persons of ordinary skill in the art, without departing from the scope of the present invention. For example, fluids other than air, as well as liquids other than wastewater, may be employed with the apparatus and method of the present invention. Likewise, although the aspirator tubes have been disclosed as being straight, with a uniform length, diameter, and angle, it is possible to construct the aspirator with curved tubes, alternating length tubes, alternating diameter tubes, and tubes with alternating angles, or combinations thereof. Similarly, any material suitable for a particular application can be used, including but not limited to various plastics, metals, ceramics, and combinations thereof.

A system and method for providing an aspirator has been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. An aspirator comprising:
    a main body having a central axis, an open first end, a closed second end, and a inner wall defining a hollow interior; and
    a plurality of equally-spaced aspirator tubes radially extending from said second end of said main body,
    wherein said aspirator tubes include open-ended conduits in communication at one end with said hollow interior, and
    wherein each aspirator tube further includes a planar fin portion extending from the aspirator tube running less than the length of the conduit from an end opposite the end of the conduit in communication with said hollow interior.

2. The aspirator of claim 1, wherein said plurality of equally-spaced aspirator tubes extend from said second end of said main body at an approximately 70° angle from said central axis in a direction opposite from said first end.

3. The aspirator of claim 1, wherein said plurality of aspirator tubes comprises five aspirator tubes.

4. The aspirator of claim 1, wherein said main body is substantially cylindrical.

5. The aspirator of claim 4, further comprising internal threads on said inner wall for engaging a hollow shaft having external threads.

6. The aspirator of claim 5, wherein said internal threads are left-handed.

7. A method of aspirating a liquid, comprising:
    inserting a portion of a hollow shaft with the aspirator of claim 1 mounted thereon into a volume of liquid; and
    rotating said hollow shaft at a speed sufficient to cause the fins on the aspirator to produce cavitation voids.

8. The method of claim 7, wherein said aspirating is used for a process selected from the group consisting of wastewater treatment, oxygenation, fermentation, aeration, hydrogenation, oxidation, and oil-sand separation.

9. The method of aspirating a liquid of claim 7, wherein the planar fin portions of the aspirator tubes are sized and shaped to extend induced cavitation.

10. The method of aspirating wastewater of claim 7, further comprising rotating said hollow shaft with an electric motor, wherein the planar fin portions of the aspirator tubes are sized and shaped to reduce current draw by said electric motor.

11. A method of aspirating a liquid, comprising:
    inserting a portion of a hollow shaft with the aspirator of claim 2 mounted thereon into a volume of liquid; and
    rotating said hollow shaft at a speed sufficient to cause the fins on the aspirator to produce cavitation voids.

12. The method of claim 11, wherein said aspirating is used for a process selected from the group consisting of wastewater treatment, oxygenation, fermentation, aeration, hydrogenation, oxidation, and oil-sand separation.

13. The method of aspirating a liquid of claim 11, wherein the planar fin portions of the aspirator tubes are sized and shaped to extend induced cavitation.

14. The method of aspirating a liquid of claim 11, further comprising rotating said hollow shaft with an electric motor, wherein the planar fin portions of the aspirator tubes are sized and shaped to reduce current draw by said electric motor.

15. A method of aspirating a liquid, comprising:
    inserting a portion of a hollow shaft with the aspirator of claim 3 mounted thereon into a volume of liquid; and
    rotating said hollow shaft at a speed sufficient to cause the fins on the aspirator to produce cavitation voids.

16. The method of claim 15, wherein said aspirating is used for a process selected from the group consisting of sewage treatment, wastewater treatment, oxygenation, fermentation, aeration, hydrogenation, oxidation, and oil-sand separation.

17. The method of aspirating a liquid of claim 15, wherein the planar fin portions of the aspirator tubes are sized and shaped to extend induced cavitation.

18. The method of aspirating a liquid of claim 15, further comprising rotating said hollow shaft with an electric motor, wherein the planar fin portions of the aspirator tubes are sized and shaped to reduce current draw by said electric motor.

19. The aspirator of claim 2, wherein said plurality of aspirator tubes comprises five aspirator tubes.

* * * * *